United States Patent
Mukerjee et al.

(10) Patent No.: US 7,833,674 B2
(45) Date of Patent: Nov. 16, 2010

(54) METHOD FOR IMPROVING ROBUSTNESS OF SOLID OXIDE FUEL CELL STACKS

(75) Inventors: Subhasish Mukerjee, Pittsford, NY (US); Karl J. Haltiner, Jr., Fairport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 12/564,324

(22) Filed: Sep. 22, 2009

(65) Prior Publication Data
US 2010/0143762 A1    Jun. 10, 2010

(51) Int. Cl.
    *H01M 8/10*     (2006.01)
    *H01M 4/82*     (2006.01)
(52) U.S. Cl. ..................... 429/479; 29/623.5
(58) Field of Classification Search ............ 29/623.5; 429/40, 209, 223
See application file for complete search history.

(56) References Cited

U.S. PATENT DOCUMENTS

| | | | | |
|---|---|---|---|---|
| 4,454,207 A | * | 6/1984 | Fraioli et al. | 429/17 |
| 5,589,285 A | * | 12/1996 | Cable et al. | 429/13 |
| 5,670,270 A | * | 9/1997 | Wallin | 429/33 |
| 6,682,842 B1 | * | 1/2004 | Visco et al. | 429/33 |
| 2009/0264284 A1 | * | 10/2009 | Sprenkle et al. | 502/304 |

* cited by examiner

*Primary Examiner*—Jennifer K Michener
*Assistant Examiner*—Carlos Barcena
(74) *Attorney, Agent, or Firm*—Thomas N. Twomey

(57) ABSTRACT

A method for forming a solid oxide fuel cell stack from a plurality of individual solid oxide fuel cells, wherein the anodes of the solid oxide fuel cells are infiltrated by one or more materials for making the anodes less sensitive to sulfur poisoning and/or less subject to carbon degradation and/or for improving the electrochemical performance of the stack, the method comprising the steps of oxidizing the anodes of the individual solid oxide fuel cells before forming a stack, building a solid oxide fuel cell stack with all of the anodes in an oxidized state, reducing all of the anodes, and then infiltrating all of the anodes with at least one of the materials.

11 Claims, 1 Drawing Sheet

METHOD FOR IMPROVING ROBUSTNESS OF SOLID OXIDE FUEL CELL STACKS

RELATIONSHIP TO GOVERNMENT CONTRACTS

The present invention was supported in part by a US Government Contract, No. DE-FC26-02NT41246. The United States Government may have rights in the present invention.

TECHNICAL FIELD

The present invention relates to solid oxide fuel cells (SOFCs); more particularly, to a method and apparatus for reducing susceptibility of SOFC anodes to sulfur poisoning and carbon-based degradation and/or for improving electrochemical performance of a fuel cell stack by infiltration of the anodes; and most particularly, to an improved method for infiltrating the anode.

BACKGROUND OF THE INVENTION

Solid Oxide Fuel Cells contain Ni-based anodes which are sensitive to sulfur poisoning and or carbon based degradation. Infiltration of the anode with materials that allow the anode to be more robust to these poisons is a known prior art strategy for improving robustness of cells. Such infiltration is best performed with the nickel in the anodes in a reduced, metallic state.

A drawback of prior art strategies and methods for infiltration is that the anode needs to have more porosity in the oxidized cell which reduces strength of the anode. If the cell is reduced and then infiltration is done prior to fabrication of the stack, keeping the cell reduced during stack fabrication is a problem because air can be useful in the sealing process, especially when using sintered glass seals.

On the other hand, it is very difficult to first reduce a cell, then infiltrate the anode, and then re-oxidize the cell before fabricating a stack, without causing the cell to crack.

What is needed in the art is an improved process for infiltrating an SOFC anode to at least partially protect the anode from exogenous poisons.

It is a principal object of the present invention to infiltrate all the SOFC anodes in an SOFC stack without causing any of the cells to subsequently crack.

SUMMARY OF THE INVENTION

Briefly described, an improved method for infiltrating the anodes of SOFC cells in accordance with the present invention comprises the following steps:
  a) oxidize all the individual SOFCs to be stacked before building a stack (or start with individual SOFCs that have been previously oxidized before building a stack);
  b) build a complete SOFC stack;
  c) reduce all the stacked SOFC anodes; and
  d) infiltrate all the stacked SOFC anodes with poison-preventing materials by either vapor-phase or liquid solution permeation.

Some benefits of the improved method are that a reduction/oxidation step is not needed prior to stack fabrication; cell strength is not compromised by having to increase porosity; and the method is cost-effective and does not add any net extra steps in manufacture.

BRIEF DESCRIPTION OF THE DRAWINGS

The present invention will now be described, by way of example, with reference to the accompanying drawing in which.

Figure 1:
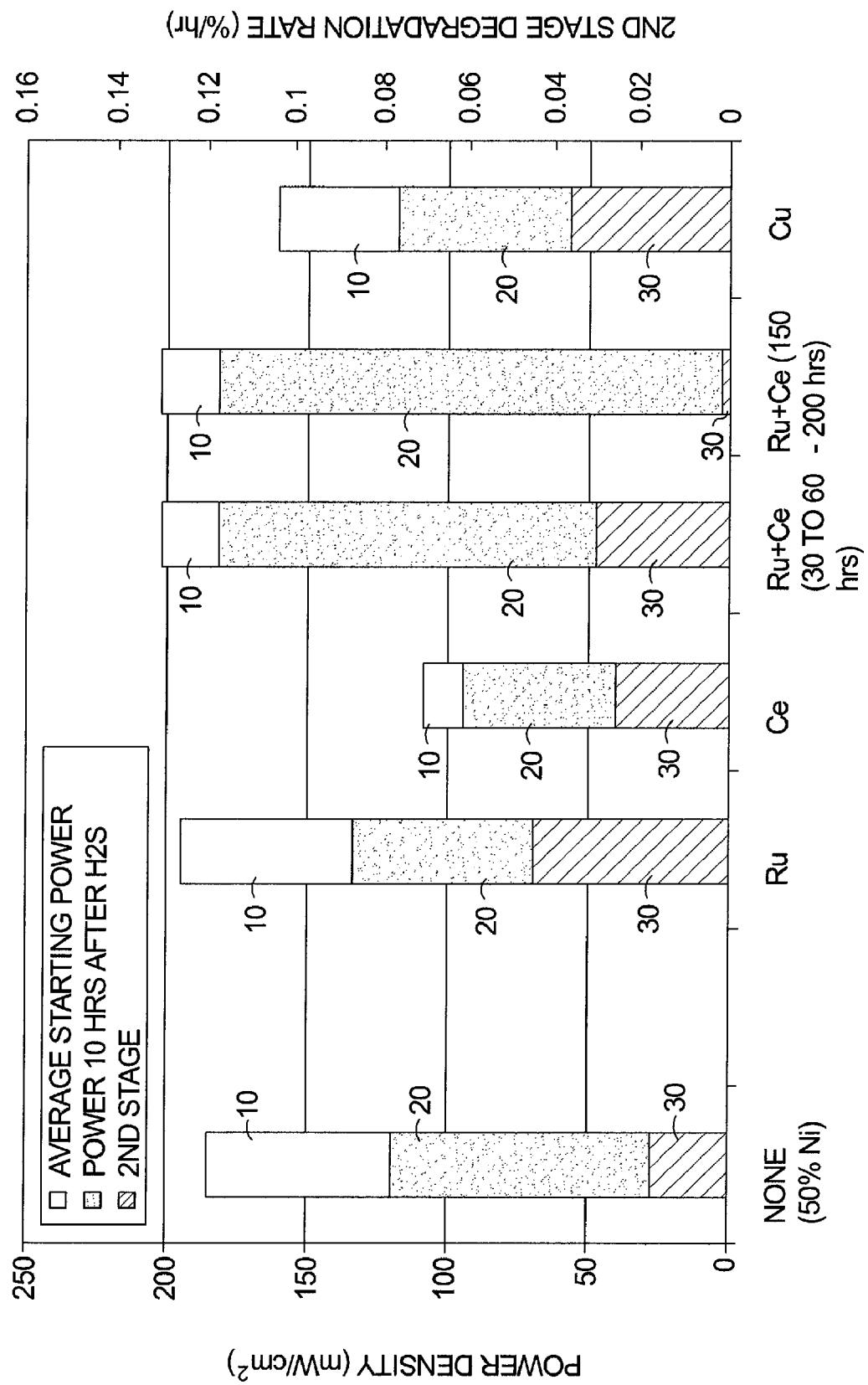
FIG. 1 is a double-ordinate histogram showing the poisoning effect of $H_2S$ exposure and rate of carbon degradation in an SOFC when the anode has been previously infiltrated by various materials in accordance with the present invention.

The exemplification set out herein illustrates one preferred embodiment of the invention, in one form, and such exemplification is not to be construed as limiting the scope of the invention in any manner.

DESCRIPTION OF THE PREFERRED EMBODIMENTS

It is known in the art to infiltrate an individual cell before building the cells into a stack. In one known method, it is known to first reduce an oxidized individual cell then to infiltrate the cell before re-oxidizing it and then building the cells into a stack. This method is very difficult to perform and frequently causes delamination of the individual cell. In another known method, the porosity of an oxidized individual cell is first increased then the individual cell is infiltrated before the individual cells are built into a stack. This method substantially decreases individual cell strength.

An improved method for infiltrating the anodes of solid oxide fuel cells in accordance with the present invention to reduce sulfur poisoning and/or carbon-based degradation comprises the steps of:

a) Oxidizing in known fashion the anodes of all of a set of individual SOFCs prior to being stacked. Oxidation of the anodes permits subsequent assembly of a complete SOFC stack without regard to shielding the anodes from oxygen. Exposure to air can also be an important element in forming the internal seals in an SOFC stack. As mentioned above, it is very difficult to first reduce each individual cell, then infiltrate the cells, and then oxidize the cells without cracking or delaminating any of the cells, before fabrication of an SOFC stack.

b) Building a complete SOFC stack having all the anodes in an oxidized state;

c) Reducing in known fashion all the anodes in the SOFC stack. The anodes are now ready for service in accordance with the prior art.

d) Infiltrating all the stacked SOFC anodes with poison-preventing materials by vapor-phase permeation or liquid solution permeation.

The operations of oxidizing, reducing, infiltrating and building are all known in the prior art. However, these prior art operations have not heretofore been performed in the novel sequence disclosed herein.

Prior to infiltrating, an optional step may be desirable, that of removably closing the anode ports during infiltration. Obviously, the anode ports are reopened after the infiltration process is completed to permit use of the SOFC stack.

Infiltration is performed in known fashion by a vapor-phase process or by liquid solution permeation by different metals and metal oxides that can benefit power performance of the stack. For example, copper, ruthenium, and/or cerium have been shown to improve robustness to sulfur poisoning; tin, gold, and/or other precious metals have been shown to improve robustness to carbon formation (degradation); and iron, cobalt, manganese and/or other precious/semi-precious metals have been shown to improve electrochemical performance of the stack. Infiltration may be carried out at sintering temperature and/or at close to room temperature.

Referring to FIG. 1, initial power density 10 (left ordinate) is shown as a function of type of material infiltrated into an SOFC anode in accordance with a method of the present invention, the left bar being a non-infiltration check SOFC. Power density 20 is shown for 10 hours after exposure of the SOFC anode to a stream of $H_2S$. Hourly percent rate of second stage degradation 30 is shown on the right ordinate.

In this demonstration, it is seen that:

a) infiltration by Cu produces about the same power density as the check after 10 hours and a somewhat higher rate of carbon degradation;

b) infiltration by ruthenium alone produces higher initial and 10-hour power densities but at a cost of a higher rate of carbon degradation;

c) infiltration by cerium alone is inferior in all respects to the check;

d) infiltration by ruthenium and cerium together produces a superior initial power density and a relatively small loss in power density after ten hours; and the carbon degradation rate approaches zero after 150-200 hours. This infiltration combination is clearly the best of any examined in this demonstration.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for forming a solid oxide fuel cell stack from a plurality of individual solid oxide fuel cells, wherein the anodes of the solid oxide fuel cells are infiltrated by one or more materials for making the anodes less susceptible to sulfur poisoning and/or carbon degradation and/or for improving the electrochemical performance of the stack, the method comprising the steps of:

a) building said solid oxide fuel cell stack with all of said anodes in an oxidized state;

b) reducing all of said anodes in said solid oxide fuel cell stack after building said solid oxide fuel cell stack; and c) infiltrating all of said anodes with at least one of said materials after reducing all of said anodes in said solid oxide fuel cell stack.

2. A method in accordance with claim 1 comprising the further step, prior to the building step, of oxidizing the anodes of said plurality of individual solid oxide fuel cells.

3. A method in accordance with claim 1 comprising the further steps of removably closing the ports of said anodes prior to said infiltrating step and opening said ports after said infiltrating step.

4. A method in accordance with claim 1 wherein said material for making said anodes less susceptible to sulfur includes ruthenium and cerium together.

5. A method in accordance with claim 1 wherein said material for making said anodes less susceptible to sulfur includes ruthenium or cerium.

6. A method in accordance with claim 1 wherein said material for making said anodes less susceptible to sulfur is selected from the group consisting of metals and metal oxides.

7. A method in accordance with claim 6 wherein said metals and metal oxides are selected from the group consisting of copper, ruthenium, cerium, and combinations thereof.

8. A method in accordance with claim 1 wherein said material for making said anodes less susceptible to carbon degradation is selected from the group consisting of tin, gold, precious metals, and combinations thereof.

9. A method in accordance with claim 1 wherein said material for improving the electrochemical performance of the stack is selected from the group consisting of iron, cobalt, manganese, precious metals, semi-precious metals, and combinations thereof.

10. A method in accordance with claim 1 wherein said infiltrating step is carried out by vapor-phase permeation.

11. A method in accordance with claim 1 wherein said infiltrating step is carried out by liquid solution permeation.

* * * * *